(12) United States Patent
Okayama et al.

(10) Patent No.: US 8,089,312 B2
(45) Date of Patent: Jan. 3, 2012

(54) AMPLIFYING CIRCUIT WITH BYPASS CIRCUIT, AND ELECTRONIC DEVICE USING THE SAME

(75) Inventors: Motoyuki Okayama, Osaka (JP); Hiroshi Iwai, Osaka (JP); Motohiko Sako, Osaka (JP); Hidenori Kitamura, Osaka (JP); Yuta Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 31 days.

(21) Appl. No.: 12/679,503

(22) PCT Filed: Nov. 25, 2008

(86) PCT No.: PCT/JP2008/003452
§ 371 (c)(1),
(2), (4) Date: Mar. 23, 2008

(87) PCT Pub. No.: WO2009/078127
PCT Pub. Date: Jun. 25, 2009

(65) Prior Publication Data
US 2010/0194475 A1    Aug. 5, 2010

(30) Foreign Application Priority Data
Dec. 17, 2007   (JP) .................................. 2007-324343

(51) Int. Cl.
*H03F 1/14* (2006.01)
(52) U.S. Cl. .......................................... 330/51; 330/151
(58) Field of Classification Search ............... 330/51, 330/151
See application file for complete search history.

(56) References Cited

U.S. PATENT DOCUMENTS

| | | | |
|---|---|---|---|
| 6,060,949 A | 5/2000 | Kaufman et al. | |
| 6,208,202 B1 | 3/2001 | Kaufman et al. | |
| 6,522,195 B2 * | 2/2003 | Watanabe et al. | ............... 330/51 |

FOREIGN PATENT DOCUMENTS

| | | |
|---|---|---|
| JP | 10-028066 | 1/1998 |
| JP | 2000-332545 | 11/2000 |
| JP | 2002-525951 | 8/2002 |
| JP | 2002-271152 | 9/2002 |
| JP | 2004-328400 | 11/2004 |
| JP | 2007-281912 | 10/2007 |
| WO | 00/18005 | 3/2000 |

OTHER PUBLICATIONS

International Search Report issued Jan. 13, 2009 in International (PCT) Application No. PCT/JP2008/003452.

* cited by examiner

*Primary Examiner* — Steven J Mottola
(74) *Attorney, Agent, or Firm* — Wenderoth, Lind & Ponack, L.L.P.

(57) ABSTRACT

An amplifying circuit with a bypassing function includes an input terminal to which a signal is input from an antenna, an amplifier connected to the input terminal, a first inductor connected between the input port and a ground, and a bypass circuit connected between the input terminal and the output port of the amplifier. The bypass circuit includes a first port connected to the input terminal, a second port connected to the output port of the amplifier, a switch, a capacitor, and a second inductor. The switch is connected in series between the first and second ports. The capacitor is connected in series to the switch between the first and second ports. The second inductor is connected in series to the switch and the capacitor between the first and second ports. Signal power is not reduced drastically even when the signal passes through the bypass circuit.

16 Claims, 12 Drawing Sheets

AMPLIFYING CIRCUIT WITH BYPASS CIRCUIT, AND ELECTRONIC DEVICE USING THE SAME

This application is a U.S. national stage application of the PCT International Application No. PCT/JP2008/003452, filed Nov. 25, 2008.

TECHNICAL FIELD

The present invention relates to an amplifying circuit with a bypassing function for receiving a signal, and to an electronic apparatus including the amplifying circuit.

BACKGROUND ART

FIG. 12 is a circuit diagram of a conventional amplifying circuit 100 with a bypassing function disclosed in JP2004-328400A. The amplifying circuit 100 includes an input port 101A connected with an antenna 101, a band-pass filter (BPF) 102 to which a signal is applied through the input port 100A from the antenna 101, an amplifier 103 to which an output signal of the BPF 102 is input, a switch 104 to which an output signal of the amplifier 103 is input, a bypass circuit 105 connected to the BPF 102 and the switch 104, and an output selector 106 for supplying a control signal to the switch 104 according to power of an output signal of the amplifier 103. The amplifier 103 includes an inverting amplifier 107 and a feedback circuit 108. The output signal of the switch 104 is supplied to an output port 100B of the amplifying circuit 100.

When power of the signal input to the amplifier 103 increases, the amplifier 103 output a signal with distortion, hence producing undesired noise and deteriorating a receiving quality. The output selector 106 detects the intensity of the output signal of the amplifier 103. According to the result of the detection, the output selector 106 determines whether or not the intensity of the signal input to the amplifier 103 is large enough to distort the output signal of the amplifier 103. Upon determining that the intensity of the signal input to the amplifier 103 is too large, the output selector 106 feeds supplies a control signal to the switch 104 to drive the switch 140 to connect between the output port 100B and the bypass circuit 105. The output selector 106 may control a feedback rate of the feedback circuit 108 to optimize the gain of the amplifier 103. These operations prevent the output signal of the amplifier 103 from having distortion.

In the conventional amplifying circuit 100, the switch 104 switches the signal to pass either the amplifier 103 or the bypass circuit 105. However, since the amplifier 103 and the bypass circuit 105 are different from each other in impedance characteristics, the profiles of propagation characteristics of the two routes of signal pass are different from each other. FIG. 13 illustrates a propagation profile of the signal passing from the antenna 101 to the switch 104 of the conventional amplifying circuit 100. The profile of the signal shown in FIG. 13 is a profile of S21 measured with a network analyzer having first and second ports. The first port is connected with a transmitting antenna. The second port is connected to amplifying circuit 100 with a bypassing function shown in FIG. 12. As shown in FIG. 13, the profile 110 of S21 represents the signal passing through the amplifier 103 while the profile 111 of S21 represents the signal passing through the bypass circuit 105. The amplifying circuit 100 with bypassing function is designed for receiving digital signals at frequencies ranging from 470 MHz to 750 MHz for a digital video broadcasting for a handheld (DVB-H) system. As shown in FIG. 13, the difference between the profiles 110 and 111 at 470 MHz is explicitly different from the difference between profiles 110 and 111 at 750 MHz. The profiles 110 and 111 are significantly different from each other at frequencies ranging from 470 MHz to 750 MHz. This difference of the profiles changes the amplitude of the signal at the output port according to the frequency of the signal before and after the switching of the switch 104. As shown in FIG. 13, the difference at about 750 MHz between the profiles 110 and 111 is about 15 dB while the difference at about 470 MHz between the profiles 110 and 111 is about 30 dB. A receiver for the DVB-H system often operates under an environment that creates frequency selective fading which causes a significant change in the intensity of the received signal by time. If the intensity of the received signal is significantly reduced by the frequency selective fading while the signal is initially received through the bypass circuit 105, the large difference between the profiles 110 and 111 deteriorates the output signal of the amplifying circuit 100 and changes a frequency characteristic of the amplifying circuit 100. The quality of the signal received by the receiver becomes low, and accordingly reduces communication quality.

SUMMARY OF THE INVENTION

An amplifying circuit with a bypassing function includes an input terminal to which a signal is input from an antenna, an amplifier connected to the input terminal, a first inductor connected between the input port and a ground, and a bypass circuit connected between the input terminal and the output port of the amplifier. The bypass circuit includes a first port connected to the input terminal, a second port connected to the output port of the amplifier, a switch, a capacitor, and a second inductor. The switch is connected in series between the first and second ports. The capacitor is connected in series to the switch between the first and second ports. The second inductor is connected in series with the switch and the capacitor between the first and second ports.

The amplifying circuit does not reduce power of a signal drastically even when the signal passes through the bypass circuit, as compared to passing through the amplifier, thus maintaining a profile of a propagation property unchanged and providing preferable transmission quality.

DETAILED DESCRIPTION OF PREFERRED EMBODIMENTS

Exemplary Embodiment 1

Figure 1:
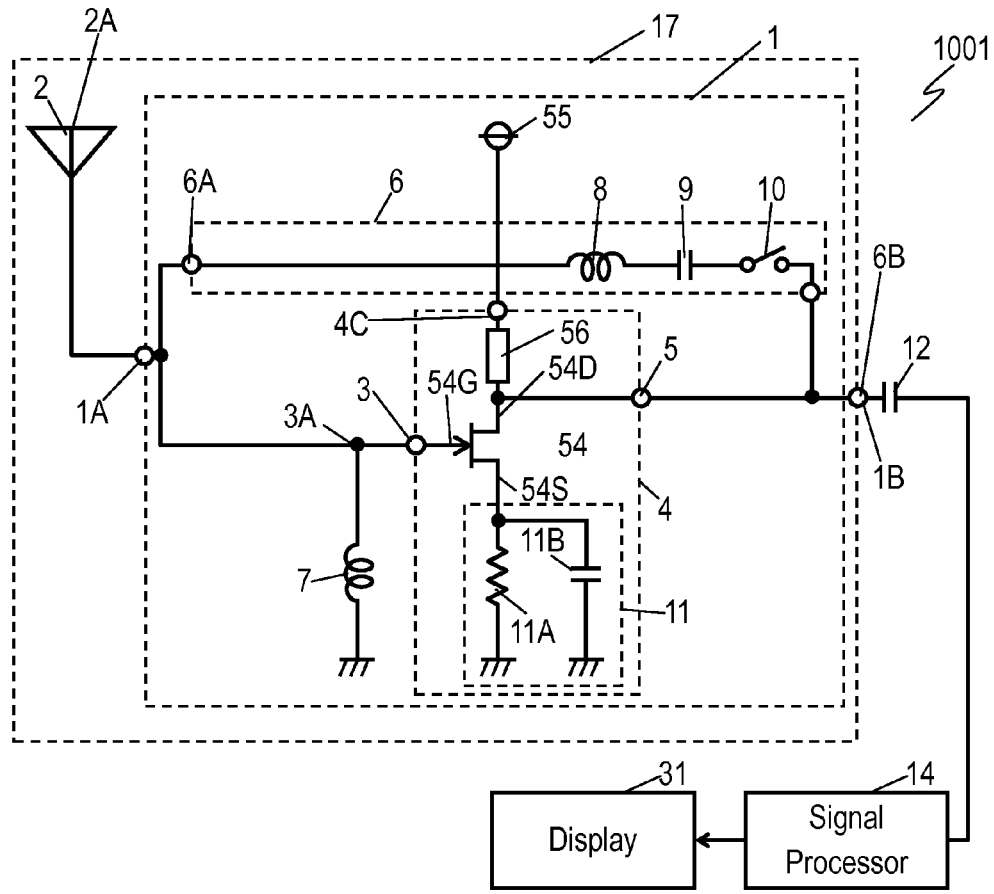
FIG. 1 is a circuit diagram of an amplifying circuit with a bypassing function according to Exemplary Embodiment 1 of the present invention.

FIG. 1 is a circuit diagram of an antenna module 17 including an amplifying circuit 1 with a bypassing function according to Exemplary Embodiment 1 of the present invention. An antenna 2 and the amplifying circuit 1 connected with the antenna 2 are installed in the antenna module 17. The amplifying circuit 1 includes an input terminal 1A to which a signal is input from the antenna 2, an amplifier 4 having an input port 3 connected to the input terminal 1A, a bypass circuit 6 having a port 6A connected to the input terminal 1A and a port 6B connected to an output port 5 of the amplifier 4, an inductor 7 connected between a node 3A and a ground, and an output terminal 1B. The output terminal 1B is connected to the output port 5 of the amplifier 4, thus being coupled to the output port 5 of the amplifier 4. The bypass circuit 6 includes an inductor 8, a capacitor 9, and a switch 10 which are connected in series between the ports 6A and 6B. Since the node 3A is connected directly to the input port 3 of the amplifier 4, the inductor 7 is actually connected between the input port 3 and the ground. A signal from the antenna 2 is input to the input port 3 of the amplifier 4 and the port 6A of the bypass circuit 6. The amplifier 4 includes a field effect transistor (FET) 54 which acts as an amplifying element for amplifying the signal input to the input port 3 and outputting the amplified signal to the output port 5. The FET 54 has a gate 54G, a source 54S, and a drain 54D. The amplifier 4 further includes a power supply port 4C and a load 56, such as a resistor or an inductor, connected in series between the power supply port 4C and the drain 54D of the FET 54. Power for driving the FET 54 to operate the amplifier 4 is input to the power supply port 4C. Power to operate the amplifier 4 of the amplifying circuit 1 is input to the power supply port 4C. The input port 3 and the output port 5 of the amplifier 4 are connected to the gate 54G and the drain 54D, respectively. In other words, the load 56 is connected in series between the power supply port 4C and the output port 5. A bias circuit 11 is connected between the source 54S and the ground. The bias circuit 11 includes a resistor 11A and a capacitor 11B which are connected in parallel to each other between the source 54S and the ground. A direct-current (DC) block capacitor 12 is connected between the output port 5 and the output terminal 1B. The output terminal 1B is also connected to a signal processor 14. The power supply terminal 55 is connected in series with a choke coil. A capacitor for eliminating noise is connected between the power supply terminal 55 and the ground. An electronic apparatus 1001 according to Embodiment 1 includes the antenna module 17, the signal processor 14 connected to the output terminal 1B of the antenna module 17 (the amplifying circuit 1), and a display 31 connected to the output terminal of the signal processor 14. The signal processor 14 processes a signal output from the output terminal 1B of the antenna module 17. The display 31 displays an image and outputs sounds based on the processed signal.

When the switch 10 is turned off to be open, the power is supplied via the power supply terminal 55 to the power supply port 4C to activate the amplifier 4. The signal received by the antenna 2 is transferred via the amplifier 4 to the output port 5.

When the intensity of the signal input to the amplifier 4 increases to distort the signal output from the amplifier 4, the switch 10 is turned on and closed to stop supply the power to the amplifier 4. This operation allows the signal received by the antenna 2 to be transferred via the bypass circuit 6 to the output port 5. Accordingly, even when the intensity of the signal received by the antenna 2 is large, the signal output from the output terminal 1B of the amplifying circuit 1 is not distorted.

Figure 2:
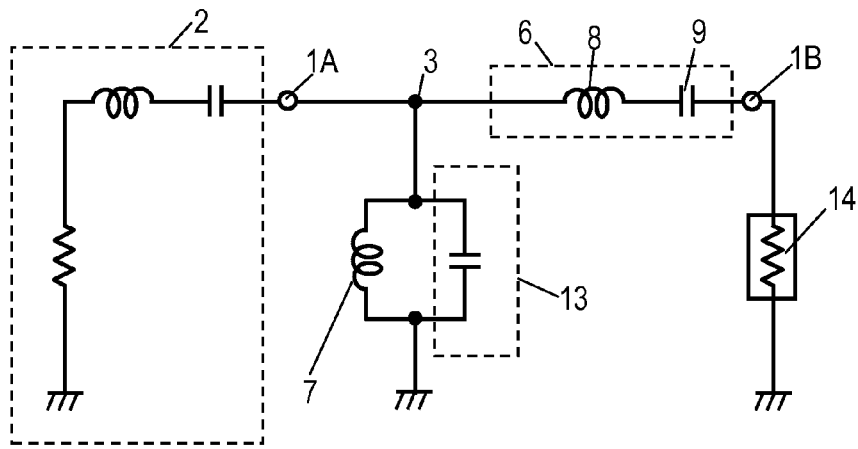
FIG. 2 is an equivalent circuit diagram of the amplifying circuit according to Embodiment 1.

FIG. 2 is an equivalent circuit of the amplifying circuit 1 while the amplifier 4 is not energized and the switch 10 is turned on. When the amplifier 4 is not energized, the power supply terminal 55 is open. In FIG. 2, the antenna 2 is an open-end type which has end 2A opening (FIG. 1). The inductor 7 and the capacitor 13 are connected in parallel between the input port 3 and the ground. The capacitor 13 is an input capacitance of the gate 54G of the FET 54 when the amplifier 4 is not energized. The inductor 8 and the capacitor 9 of the bypass circuit 6 are connected in series between the input port 3 and the signal processor 14. The DC block capacitor 12 shown in FIG. 1 is substantially conducted for signals at a frequency received by the antenna 2, thus not being shown in FIG. 2. The inductor 7, the capacitor 13, the inductor 8, and the capacitor 9 constitute a band-pass filter to appropriately control a propagation property from the antenna 2 to the output port 5 with respect to the frequency of the received signal.

The capacitance of the capacitor 13 mainly includes the capacitance of the gate 54G of the FET 54 but actually, further includes the capacitance of the capacitor 11B in the bias circuit 11. When the propagation property of the bypass circuit 6 can hardly be set to its optimum level with the capacitor 11B and the input capacitance for the gate 54G, at least one of a capacitor and an inductor is connected between the input terminal 1A and the input port 3 to optimize the property.

Figure 3:
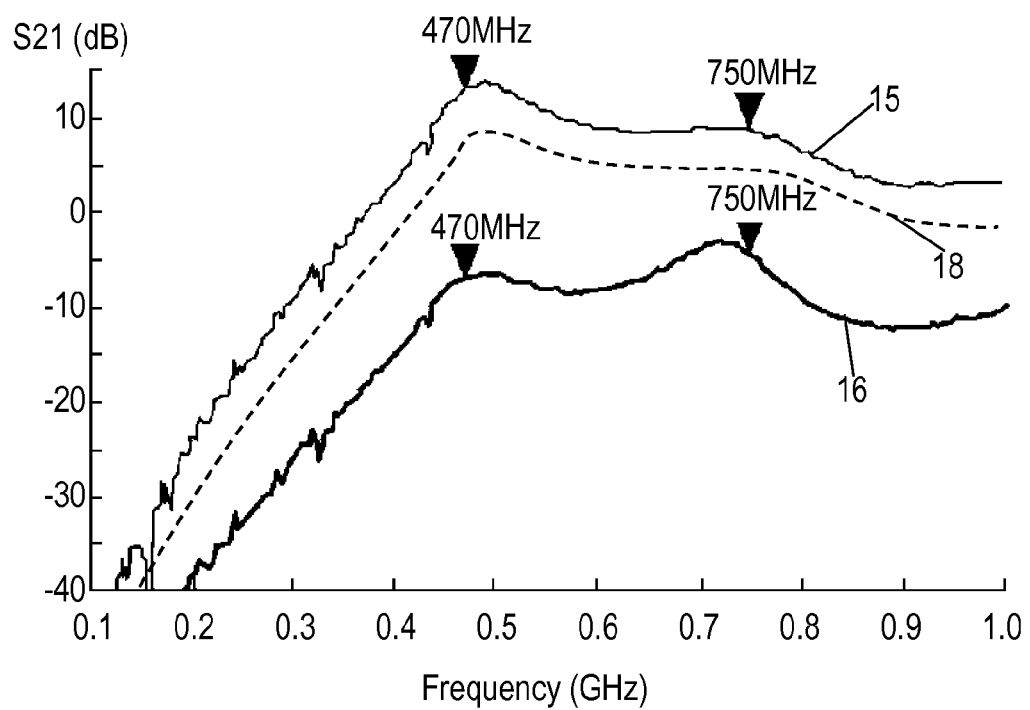
FIG. 3 illustrates profiles of a propagation property of the amplifying circuit according to Embodiment 1.
Figure 13:
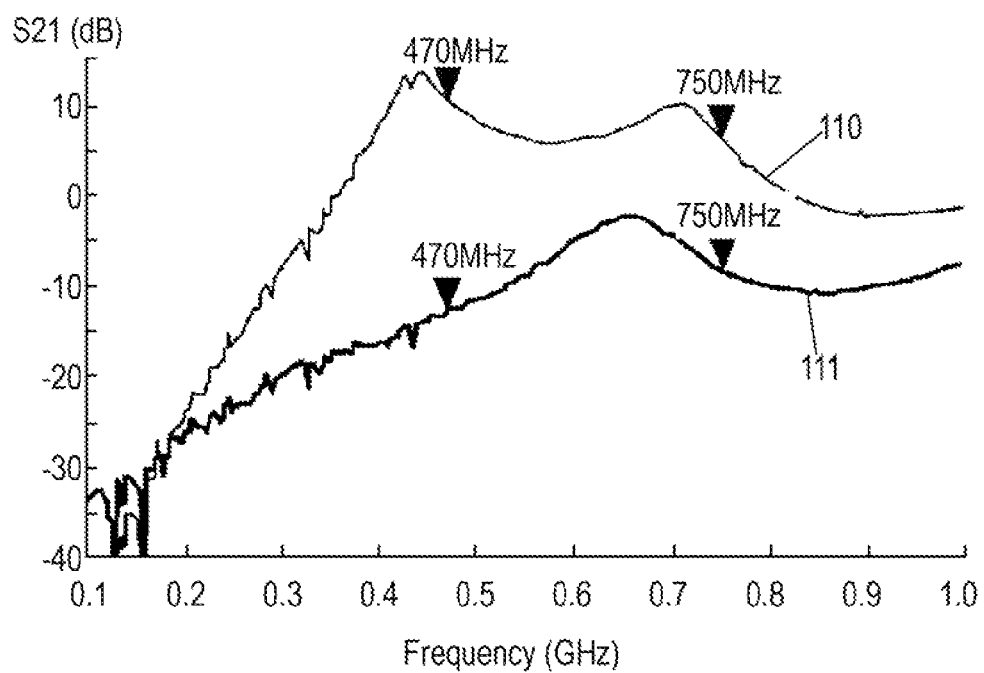
FIG. 13 illustrates profiles of a propagation property of the conventional amplifying circuit.

FIG. 3 illustrates the propagation property from the input terminal 1A to the output terminal 1B in the amplifying circuit 1. Profile 15 represents a signal from the antenna 2 when the amplifier 4 is activated with the switch 10 turned off. Profile 16 represents the signal when the amplifier 4 is not energized and deactivated with the switch 10 turned on, i.e., the signal passing from the antenna 2 via the bypass circuit 6. As shown in FIG. 3, the difference between the two profiles of the propagation property is substantially constant within a range between 470 MHz and 750 MHz. The profiles 15 and 16 of the propagation property of the amplifying circuit 1 according to Embodiment 1 are more closely approximated to each other than the profiles 110 and 111 of the amplifying circuit 100 with a bypassing function shown in FIG. 13. Therefore, upon being input from the antenna 2 to the input terminal 1A, the signal passes through the bypass circuit 6 and does not attenuate significantly. Further, the amount of the attenuation is constant throughout frequencies, providing high signal-transmission quality.

The amplifying circuit 1 operates in three different modes A1 to A3 depending on the status of the switch 10 and the operation of the amplifier 4. In the mode A1, while the switch 10 is turned off to be open, the amplifier 4 is energized to operate with power supplied to power supply port 4C from the power supply terminal 55. In the mode A2, while the switch 10 is turned on to be closed, the amplifier 4 is energized to operate with power supplied to power supply port 4C from the power supply terminal 55. In the mode A3, while the switch 10 is turned on to be closed, the amplifier 4 does not operate with no power supplied to power supply port 4C.

When the intensity of the signal input to the amplifier 4 is relatively small to prevent a signal output from the amplifier 4 from being distorted, the amplifying circuit 1 operates in the mode A1. In the mode A1, most of the signal input from the antenna 2 reaches output port 4 via the amplifier 4.

When the intensity of the signal input to the amplifier 4 is large to distort the signal output from the amplifier 4, the amplifying circuit 1 operates in the mode A3. In the mode A3, most of the signal input from the antenna 2 reaches output port 5 via the bypass circuit 6.

When the intensity of the signal input to the amplifier 4 is medium between the intensities in the modes A1 and A3, the amplifying circuit 1 operates in the mode A2. In the mode A2, the amplifier 4 operates while the bypass circuit 6 is connected. The bypass circuit 6 in the mode A2 functions as a feedback circuit to attenuate the gain of the amplifier 4 to an appropriate level. This eliminates a feedback circuit 108 of the conventional amplifying circuit 100 with a bypassing function shown in FIG. 12, hence reducing the size of the amplifying circuit 1. The amplifying circuit 1 operating in the mode A2 provides profile 18 between the two profiles 15 and 16 shown in FIG. 3, thus preventing the power of the input signal from drastically decreasing.

More particularly, the amplifying circuit 1 operates in the modes A1 to A3 in response to the intensity of the signal input to the input port 3 of the amplifier 4, as described below. When the intensity of the input signal is smaller than a first predetermined threshold level, the amplifying circuit 1 operates in the mode A3. When the intensity of the input signal is larger than the first threshold level and smaller than a second predetermined threshold level which is greater than the first threshold level, the amplifying circuit 1 operates in the mode A2. When the intensity of the input signal is greater than the second threshold level, the amplifying circuit 1 operates in the mode A1.

Alternatively, the amplifying circuit 1 according to Embodiment 1 can operates only in the two modes A1 and A3 but not in the mode A2. This operation reduces the time for supplying power to the amplifier 4, accordingly reducing the power consumption of the amplifying circuit 1. More specifically, the amplifying circuit 1 operates in the modes A1 and A3 in response to the intensity of the signal input to the input port 3 of the amplifier 4, as described below. When the intensity of the input signal is smaller than a predetermined threshold level, the amplifying circuit 1 operates in the mode A3. When the intensity of the input signal is larger than the threshold level, the amplifying circuit 1 operates in the mode A1.

Figure 4:
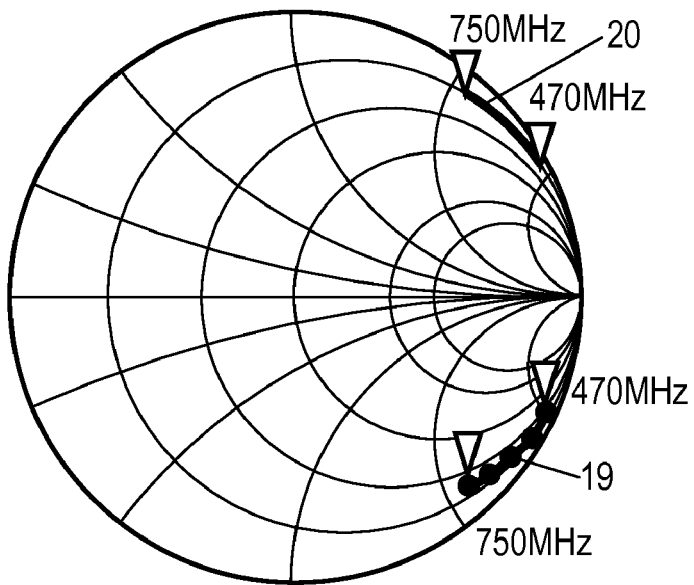
FIG. 4 illustrates an input impedance of an amplifier of the amplifying circuit according to Embodiment 1.
Figure 5:
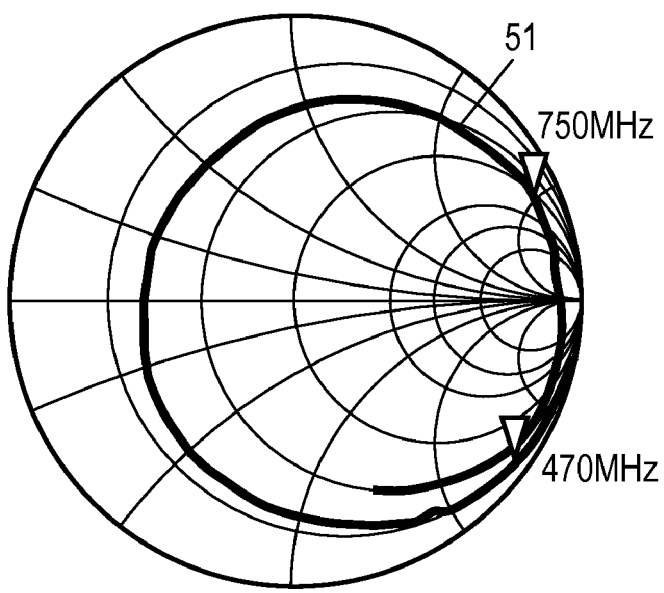
FIG. 5 illustrates an input impedance of an antenna connected with the amplifying circuit according to Embodiment 1.
Figure 6:
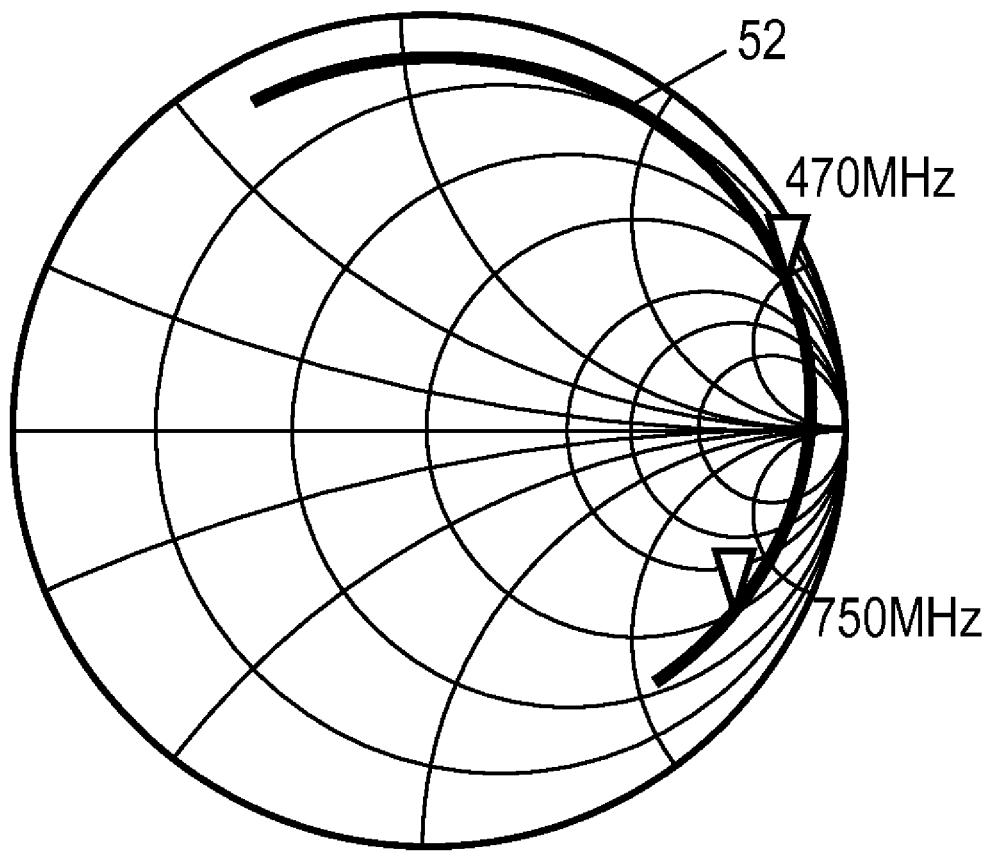
FIG. 6 illustrates an input impedance of the amplifying circuit according to Embodiment 1.

A method of designing the antenna module 17 including the amplifying circuit 1 with a bypassing function according to Embodiment 1 as a wide-band antenna module will be described below. FIGS. 4 to 6 illustrate profiles of the frequency characteristic of impedance at various portions of the antenna module 17 including the amplifying circuit 1. The antenna module 17 is designed for use with Digital Video Broadcasting for Handheld (DVB-H) to receive signals at frequencies ranging from 470 MHz to 750 MHz.

FIG. 4 is a Smith chart illustrating the input impedance 19 of the amplifier 4 in view from the input port 3. As represented by the capacitor 13 shown in FIG. 2, the input impedance 19 is capacitive in a range from 470 MHz to 750 MHz due to mainly the capacitance at the gate 54G of the FET 54. When the antenna 2 has an impedance 20 complex conjugate to the input impedance 19 of the amplifier 4, the antenna 2 matches the amplifier 4 in impedance, inputting the signal input by the antenna 2 to the amplifier 4 efficiently. However, the impedance of the antenna 2 generally shifts clockwise on the Smith chart as the frequency changes from low to high, and hence, hardly matching the impedance 20 shown in FIG. 4. FIG. 5 is a Smith chart illustrating the impedance 51 of an open-end type meander antenna which can be used as the antenna 2. As shown in FIG. 5, the impedance 51 widely shifts clockwise from 470 MHz to 750 MHz. Thus, the impedance 51 of the antenna 2 can hardly match the impedance 20 shown in FIG. 4. In other words, the antenna 2 hardly matches the amplifier 4 in impedance.

FIG. 6 is a Smith chart illustrating the input impedance 52 of the amplifier 4 in view from the node 3A. In order to allow the antenna 2 to match the amplifier 4 in impedance, the input impedance 52 is adjusted by the inductor 7. The input impedance 52 shown in FIG. 6 has a profile crossing the horizontal axis of the Smith chart at substantially an intermediate frequency in the range between 470 MHz and 750 MHz. This profile allows the impedance 52 to be complex conjugate to the impedance 51 of the antenna 2 shown in FIG. 5 at a frequency of about 470 MHz and at a frequency at about 750 MHz, hence allowing the antenna 2 to match the amplifying circuit 1 in impedance. At the intermediate frequency in the range between 470 MHz and 750 MHz, the antenna 2 resonates to increase the power of the received signal. Therefore, even when the antenna 2 does not match the amplifying circuit 1 in impedance, the signal input to the amplifier 4 has a comparatively large intensity. As described, the inductor 7 functions as a component matching the antenna 2 to the amplifying circuit 1 in impedance in the modes A2 and A3 when the amplifier 4 operates. The inductor 7 functions as a component for forming a band-pass filter in the mode A1 when the amplifier 4 does not operate. The inductor 7, a single component, functioning as the two difference functional components, reduces the size of the amplifying circuit 1 with a bypassing function. FIG. 3 illustrates the propagation property from the antenna 2 to the output terminal 1B of amplifying circuit 1 designed by the above method.

The antenna 2, upon being implemented by a very small antenna, may have impedance different from the impedance 51 shown in FIG. 5. In this case, the impedance of the antenna 2 in view from the input terminal 1A can matched the impedance 51 shown in FIG. 5 with at least one of an inductor and a capacitor connected in series between the antenna 2 and the input terminal 1A. More particularly, the inductor connected in series between the antenna 2 and the input terminal 1A causes the impedance to shift clockwise at higher frequencies in the frequency range. The capacitor connected in series between the antenna 2 and the input terminal 1A causes the impedance to shift counter-clockwise at lower frequencies in the frequency range. By properly adjusting the inductor and the capacitor, the impedances near the lowest and highest frequencies in the frequency range can shift to predetermined positions to allow the impedance to intersect the horizontal axis of the Smith chart at substantially an intermediate frequency in the range. Therefore, the impedance of the antenna 2 in view from the input terminal 1A is complex conjugate to the input impedance 52 shown in FIG. 6 even near the highest and lowest frequencies in the frequency range. Thus, the antenna 2 matches the amplifying circuit 1 in impedance throughout a wide range of frequencies, inputting the signal received by the antenna 2 to the amplifying circuit 1 efficiently.

The antenna 2 of the antenna module 17 according to Embodiment 1 is the open-end type antenna, but may be an antenna element, such as a loop antenna or an inverted-F antenna, including an antenna element connected to a ground. The open-end type antenna easily provides the impedance 51 shown in FIG. 5 and can eliminate the adjusting with the inductor or the capacitor connected between the antenna 2 and the input terminal 1A, hence providing the antenna module 17 with a small size and a high efficiency.

The inductor 8 is shown in FIG. 1 as a lumped-parameter element, but may be implemented by a distributed constant element distributed along the transmission path of the bypass circuit 6. This arrangement reduces the number of inductors to be installed, hence further reducing the size of the amplifying circuit 1.

The FET 54 is included in the amplifier 4 shown in FIG. 1, but may be replaced by a bipolar transistor. The input impedance of the base of the bipolar transistor is closer to 50 ohms on a Smith chart than the input impedance of the gate 54G of the FET 54 is, hence providing the antenna module 17 and the amplifying circuit 1 which can receive radio signals in a wider frequency range.

Exemplary Embodiment 2

Figure 7A:
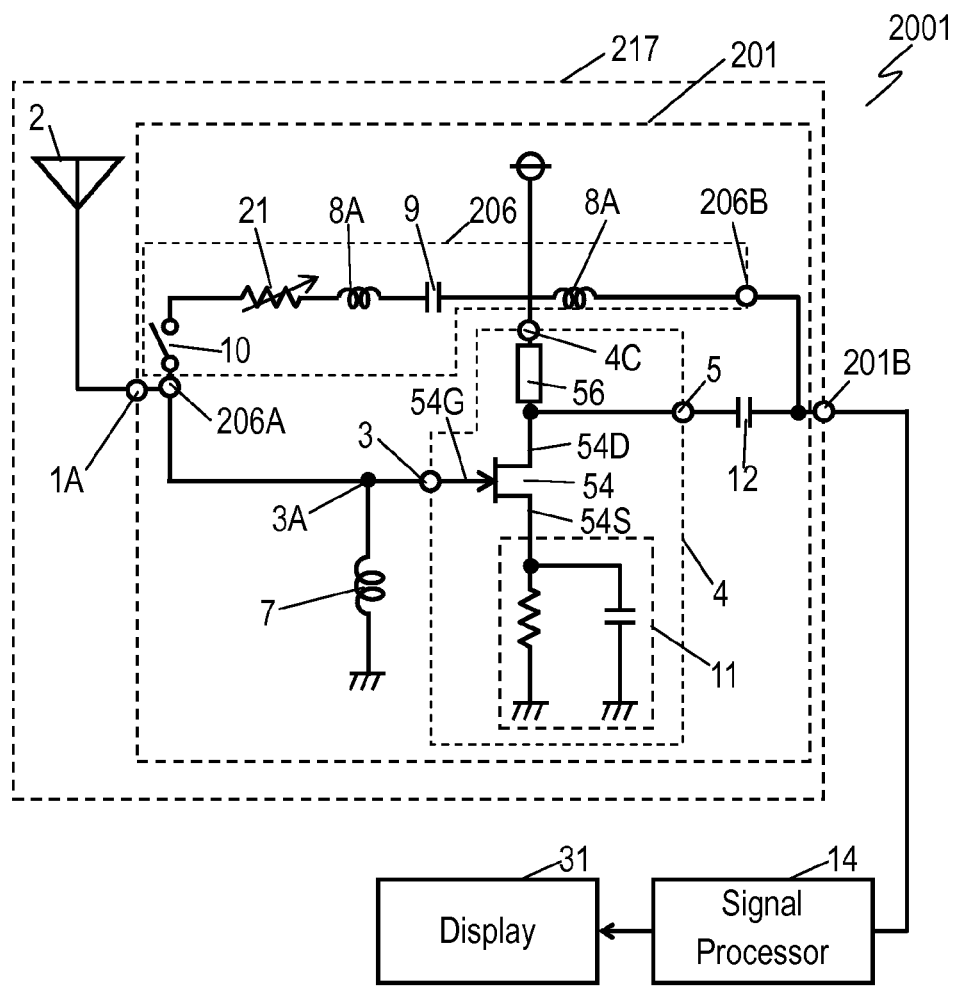
FIG. 7A is a circuit diagram of an amplifying circuit with a bypassing function according to Exemplary Embodiment 2 of the invention.

FIG. 7A is a circuit diagram of an amplifying circuit 201 with a bypassing circuit according to Exemplary Embodiment 2 of the present invention. In FIG. 7A, components identical to those of the amplifying circuit 1 according to Embodiment 1 shown in FIG. 1 are denoted by the same reference numerals, and their description will be omitted. The amplifying circuit 201 includes an output terminal 201B and a bypass circuit 206 instead of the output terminal 1B and the bypass circuit 6 of the amplifying circuit 1 shown in FIG. 1. An antenna module 217 according to Embodiment 2 includes the amplifying circuit 201 and an antenna 2 connected to an output terminal 1A of the amplifying circuit 201. An electronic apparatus 2001 according to Embodiment 2 includes the antenna module 217, a signal processor 14 connected to the output terminal 201B of the antenna module 217 (the amplifying circuit 201), and a display 31 connected to the output terminal of the signal processor 14. A direct-current (DC) block capacitor 12 is connected between the output terminal 210B and the output port 5 of the amplifier 4. More specifically, the output terminal 201B is coupled to the output port 5 of the amplifier 4 via the DC block capacitor 12.

In the bypass circuit 206 shown in FIG. 7A, inductors 8A are provided as a distributed constant element distributed along the transmission path in the bypass circuit 206 instead of the inductor 8, a lumped constant element, of the bypass circuit 6 according to Embodiment 1 shown in FIG. 1. Since the transmission path itself has an inductance at higher frequencies, the inductance is positively used as the inductors 8A can eliminate a chip element corresponding to the inductor 8 shown in FIG. 1. This arrangement allows the amplifying circuit 201 to be manufactured efficiently and have a small size.

The bypass circuit 206 includes a port 206A connected to the input terminal 1A and a port 206B connected to the output terminal 201B. The bypass circuit 206 further includes a variable resistor 21, a switch 10, a capacitor 9, and the inductors 8A which all are connected in series between the ports 206A and 206B.

In the mode A2 where the switch 10 is turned on and the amplifier 4 operates, the bypass circuit 206 functions as a feedback circuit of the amplifier 4 similar to the bypass circuit 6 according to Embodiment 1. The gain of the amplifying circuit 201 can be adjusted in response to the intensity of the signal input to the amplifier 4 by controlling the variable resistor 21. In the electronic apparatus 2001 according to Embodiment 2, the signal processor 14 measures a characteristic, such as power of the signal or a carrier/noise (C/N) ratio of the received signal, to control the variable resistor 21 in accordance with the measured characteristic. This operation adjusts the gain of the amplifier 4 accurately in response to the signal received by the antenna 2. In the mode A3 where the switch 10 is turned on and the amplifier 4 does not operate, the resistance of the variable resistor 21 is zero. This operation reduces the loss of the signal passing through the bypass circuit 206 in the mode A3.

In the bypass circuit 206 shown in FIG. 7A, the switch 10 is connected directly to the port 206A connected to the input terminal 1A. The inductors 8A and the capacitor 9 are connected between the switch 10 and the port 206B connected to the output terminal 201B. Accordingly, when the switch 10 is turned off, the impedance of the bypass circuit 206 in view from the input terminal 1A is that of opening. This operation prevents the signal from being disturbed by the bypass circuit 206 in the mode A1 where the switch 10 is turned off to be open.

The port 206B of the bypass circuit 206 shown in FIG. 7A is connected to the output terminal 201B, and can be connected to the output port 5 of the amplifier 4 similar to the port 6B of the bypass circuit 6 according to Embodiment 1.

Figure 7B:
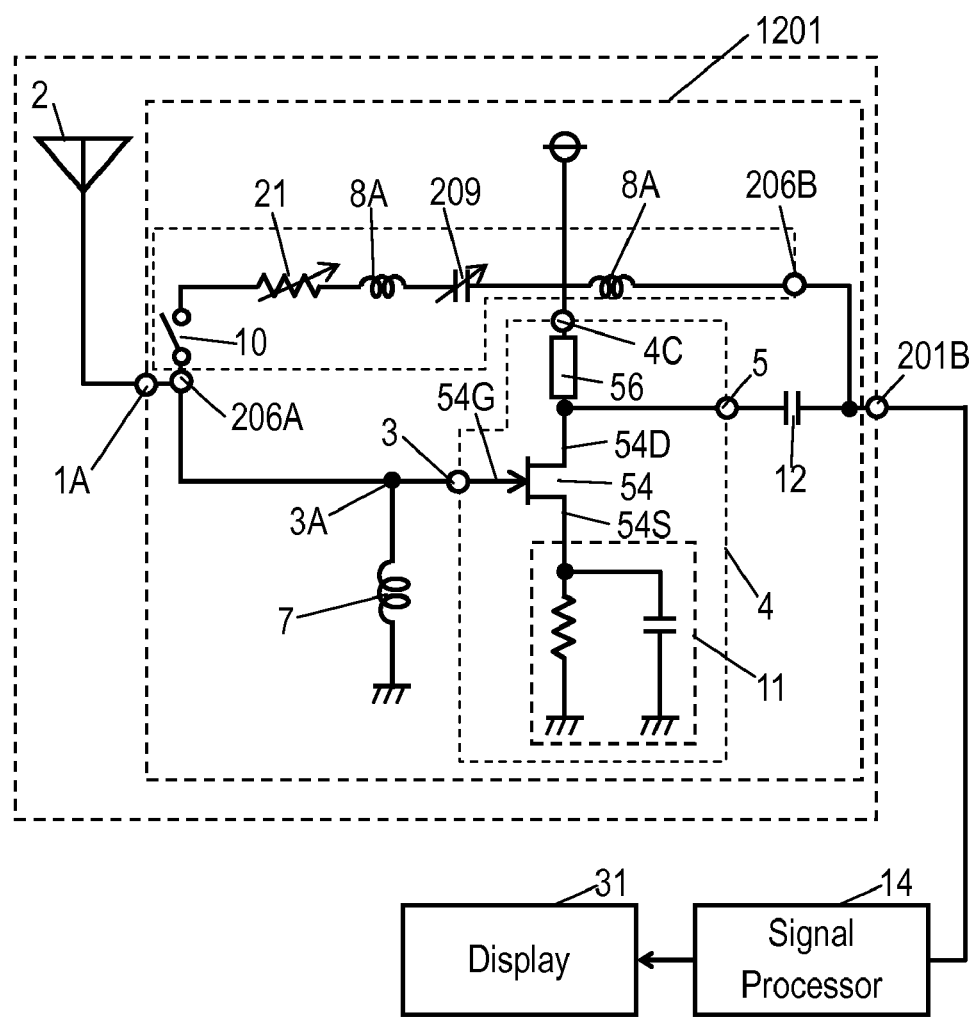
FIG. 7B is a circuit diagram of another amplifying circuit with a bypassing function according to Embodiment 2.

FIG. 7B is a circuit diagram of another amplifying circuit 1201 with a bypassing function according to Embodiment 2. In FIG. 7B, components identical to those of the amplifying circuit 201 shown in FIG. 7A are denoted by the same reference numerals, and their description will be omitted. The amplifying circuit 1201 includes a variable capacitance element 209 instead of the capacitor 9 of the amplifying circuit 201 shown in FIG. 7A. By adjusting the capacitance of the variable capacitance element 209 and the resistance of the variable resistor 21, characteristics, such as gain and phase of the amplifying circuit 1201 can favorably be adjusted precisely in accordance with the intensity of the signal input to the amplifier 4 in the mode A2 where the bypass circuit functions as a feedback circuit.

Figure 7C:
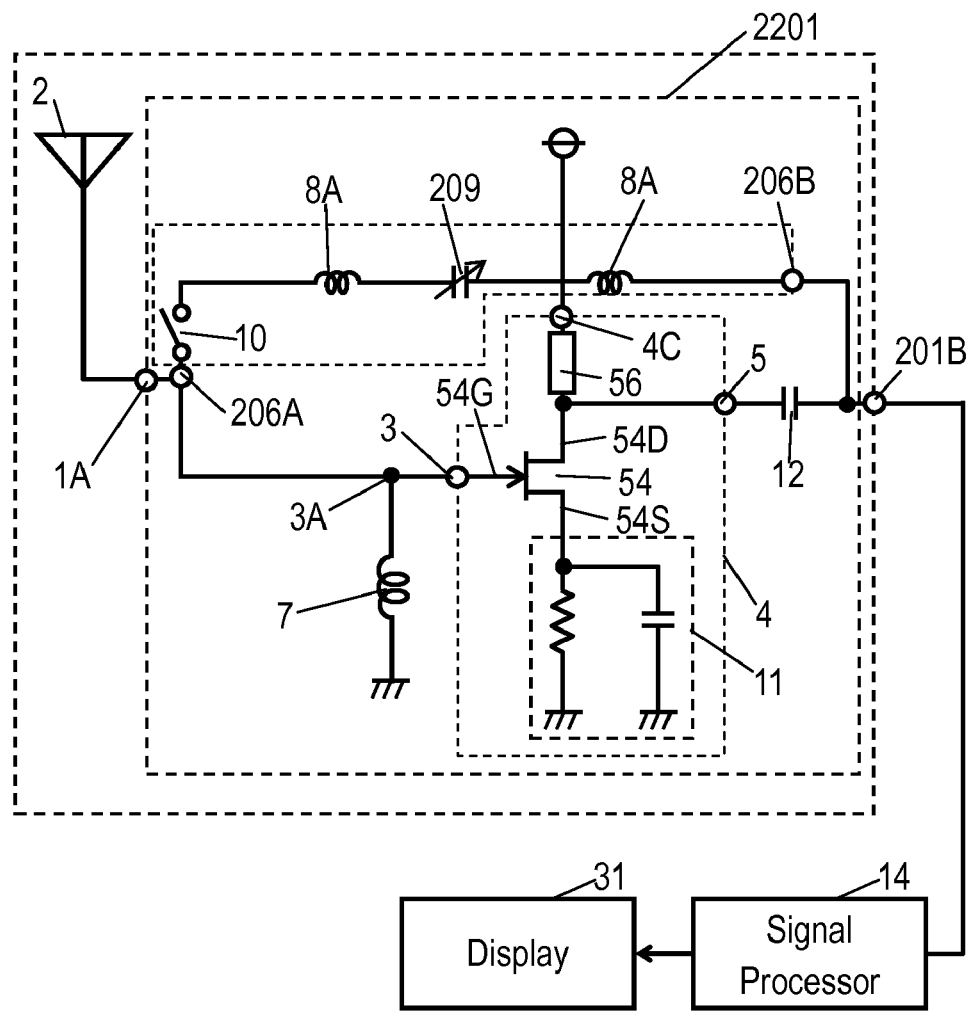
FIG. 7C is a circuit diagram of still another amplifying circuit with a bypassing function according to Embodiment 2.

FIG. 7C is a circuit diagram of still another amplifying circuit 2201 with a bypassing function according to Embodiment 2. In FIG. 7C, components identical to those of the amplifying circuit 201 shown in FIG. 7A are denoted by the same reference numerals, and their description will be omitted. The amplifying circuit 2201 does not include the variable resistor 21 of the amplifying circuit 1201 shown in FIG. 7B but includes the switch 10, the variable capacitance element 209, and the inductors 8A connected in series between the ports 206A and 206B. By adjusting the capacitance of the variable capacitance element 209, characteristics, such as gain and phase of the amplifying circuit 2201 can favorably be adjusted precisely in accordance with the intensity of the signal input to the amplifier 4 in the mode A2 where the bypass circuit functions as a feedback circuit.

Exemplary Embodiment 3

Figure 8:
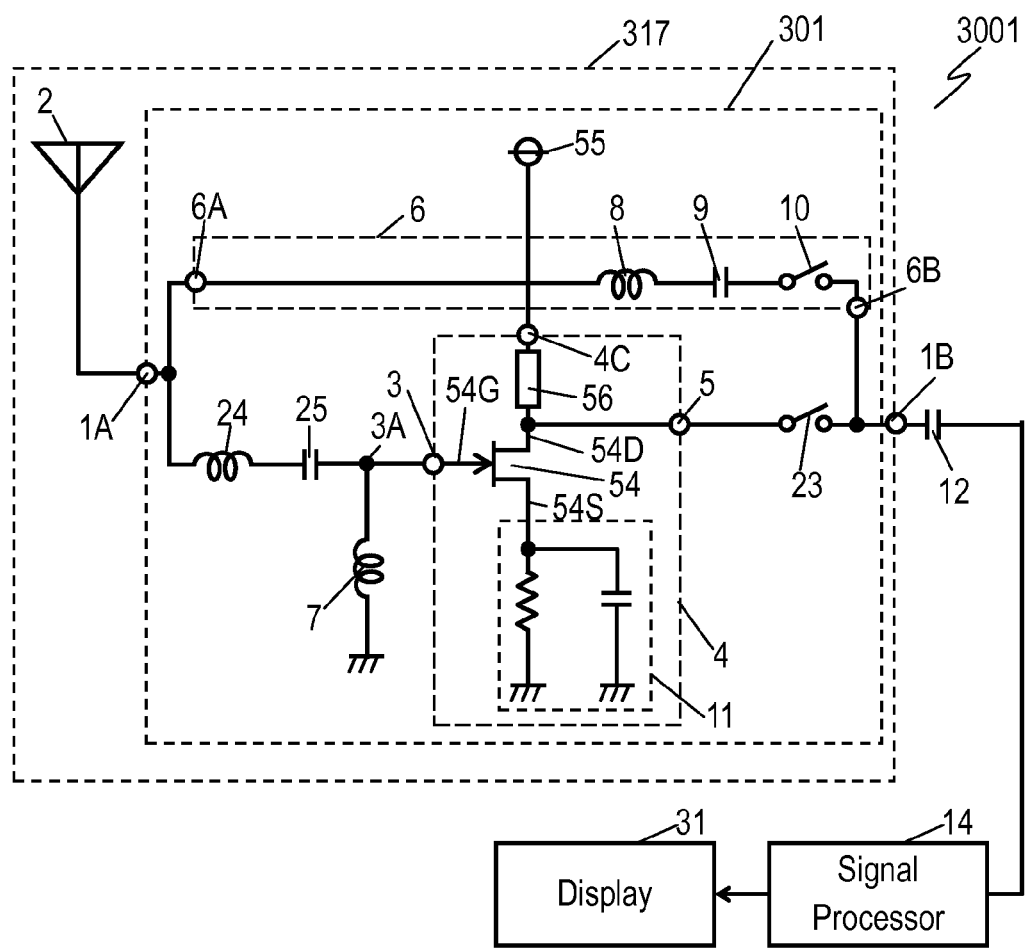
FIG. 8 is a circuit diagram of an amplifying circuit with a bypassing function according to Exemplary Embodiment 3 of the invention.

FIG. 8 is a circuit diagram of an amplifying circuit 301 with a bypassing function according to Exemplary Embodiment 3 of the present invention. In FIG. 8, components identical to those of the amplifying circuit 1 according to Embodiment 1 shown in FIG. 1 are denoted by the same reference numerals, and their description will be omitted. Antenna module 317 according to Embodiment 3 includes the amplifying circuit 301 and an antenna 2 connected to an output terminal 1A of the amplifying circuit 301. An electronic apparatus 3001 according to Embodiment 3 includes the antenna module 317, a signal processor 14 connected to the output terminal 301B of the amplifying circuit 301 of the antenna module 317, and a display 31 connected to an output terminal of the signal processor 14.

The amplifying circuit 301 shown in FIG. 8 further includes a switch 23, an inductor 24, and a capacitor 25 in the amplifying circuit 1 according to Embodiment 1 shown in FIG. 1. The switch 23 is connected between the output terminal 1B and the output port 5 of the amplifier 4. The inductor 24 and the capacitor 25 are connected in series between the input terminal 1A and the node 3A. The output terminal 1B is coupled to the output port 5 of the amplifier 4 via the switch 23.

The amplifying circuit 301 operates in three modes B1 to B3 depending on the status of the switches 10, 23 and the operation of the amplifier 4. In the mode B1, the switch 10 is turned off to be open, the switch 23 is turned on, and the amplifier 4 operates to have power supplied to supply port 4C from the power supply terminal 55. In the mode B2, the switches 10 and 23 are turned on, and the amplifier 4 operates with power supplied to power supply port 4C from the power supply terminal 55. In the mode B3, the switch 10 is turned on, the switch 23 is turned off to be open, and the amplifier 4 does not operate so that no power is supplied to power supply port 4C.

When the intensity of signal input to the amplifier 4 is relatively small so as not to distort the signal output from the amplifier, the amplifying circuit 301 operates in the mode B1. In the mode B1, most of the signal input from the antenna 2 reaches the output terminal 1B via the amplifier 4.

When the intensity of the signal input to the amplifier 4 is large so as to distort the signal output from the amplifier 4, the amplifying circuit 301 operates in the mode B3. In the mode B3, most of the signal input from the antenna 2 reaches the output port 5 via the bypass circuit 6.

When the intensity of the signal input to the amplifier 4 is intermediate between respective intensities in the modes B1 and B3, the amplifying circuit 301 operates in the mode B2. In the mode B2, the bypass circuit 6 functions as a feedback circuit to attenuate the gain of the amplifier 4 to an appropriate level. This arrangement eliminates a feedback circuit 108 of the conventional amplifying circuit 100 shown in FIG. 12, hence reducing the size of the amplifying circuit 301. The amplifying circuit 301 operating in the mode B2 has a propagation property of profile 18 between the profiles 15 and 16 shown in FIG. 3, preventing the intensity of the input signal from decreasing drastically.

More particularly, the amplifying circuit 301 operates in the modes B1 to B3 in response to the intensity of the signal input to the input port 3 of the amplifier 4, as described below. When the intensity of the signal is smaller than a first predetermined threshold level, the amplifying circuit 301 operates in the mode B3. When the intensity of the signal is larger than the first threshold level and smaller than a second predetermined threshold level which is larger than the first threshold level, the amplifying circuit 301 operates in the mode B2. When the intensity of the signal is larger than the second threshold level, the amplifying circuit 301 operates in the mode B1.

Alternatively, the amplifying circuit 301 can be configured to operate only in the two modes B1 and B3 but not in the mode B2. This operation reduces the time to supply power to the amplifier 4, and accordingly, reduces the power consumption of the amplifying circuit 301. More specifically, the amplifying circuit 301 operates in the modes B1 and B3 in response to the intensity of the signal input to the input port 3 of the amplifier 4, as described below. When the intensity of the input signal is smaller than a predetermined threshold level, the amplifying circuit 301 operates in the mode B3. When the intensity of the input signal is larger than the threshold level, the amplifying circuit 301 operates in the mode B1.

When the amplifying circuit 301 according to Embodiment 3 operates in the mode B3, the switch 23 is turned off to be open to disconnect the port 6B of the bypass circuit 6 from the output port 5 of the amplifier 4, thus eliminating influence of the impedance at the output port 5 of the amplifier 4. This improves the quality of the signal passing from the antenna 2 via the bypass circuit 6 to the output terminal 1B in the mode B3.

The inductor 24 and the capacitor 25 connected in series between the input terminal 1A and the node 3A allow the impedance of the antenna 2 to be closely approximated to the impedance 51 shown in FIG. 5, thus allowing the antenna 2 to be used in a wide frequency range.

The switch 10 shown in FIG. 8 is connected directly to the port 6B of the bypass circuit 6 while the inductor 8 and the capacitor 9 are connected between the switch 10 and the port 6A. The two switches 10, 23 are single pole single throw (SPST) switches. If the amplifying circuit 301 operates only in the modes B1 and B3 but not in the mode B2, two SPST switches 10 and 23 may be replaced by one single pole double throw (SPDT) switch, which reduces the size of the amplifying circuit 301.

Exemplary Embodiment 4

Figure 9:
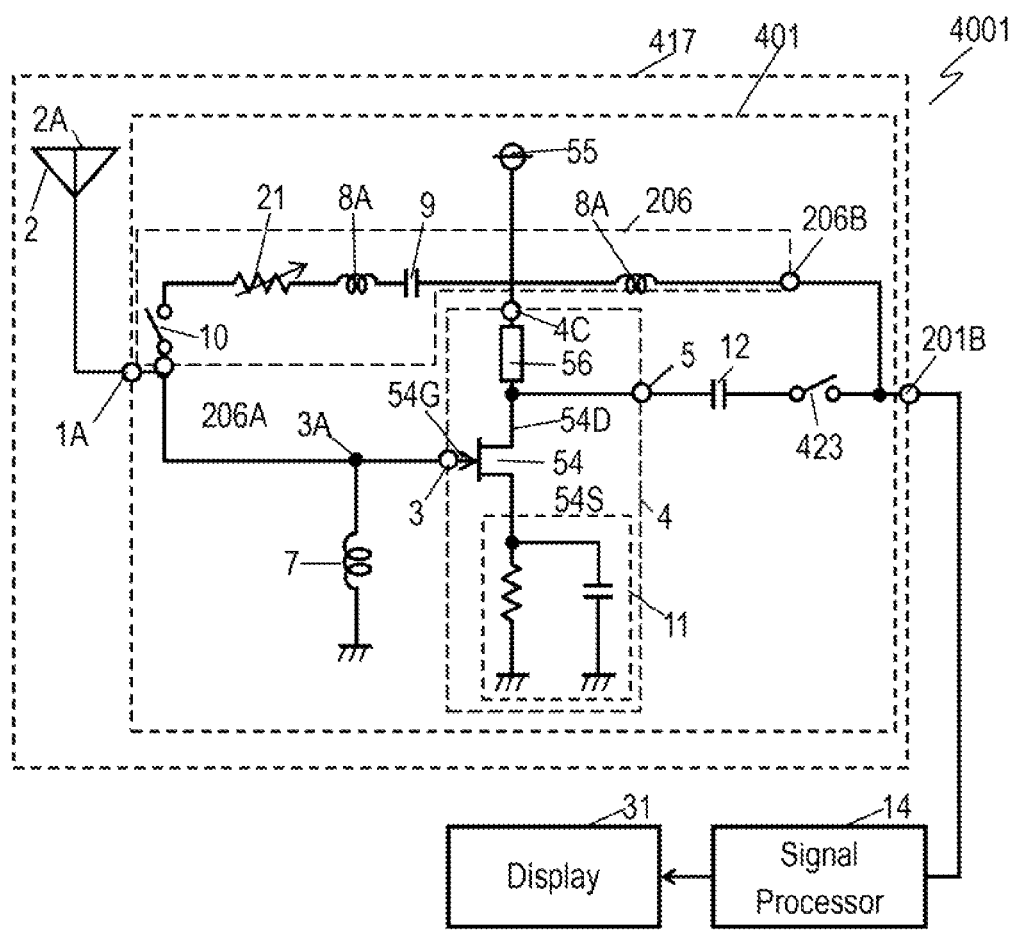
FIG. 9 is a circuit diagram of an amplifying circuit with a bypassing function according to Exemplary Embodiment 4 of the invention.

FIG. 9 is a circuit diagram of an amplifying circuit 401 with a bypassing function according to Exemplary Embodiment 4 of the present invention. In FIG. 9, components identical to those of the amplifying circuit 201 according to Embodiment 2 shown in FIG. 7A are denoted by the same reference numerals, and their description will be omitted. The amplifying circuit 401 further includes a switch 423 additionally to the amplifying circuit 201 shown in FIG. 7A. The DC block capacitor 12 and the switch 423 are connected in series between the output terminal 201B and the output port 5 of the amplifier 4. An antenna module 417 according to Embodiment 4 includes the amplifying circuit 401 and an antenna 2 connected to an output terminal 1A of the amplifying circuit 401. An electronic apparatus 4001 according to Embodiment 4 includes the antenna module 417, a signal processor 14 connected to the output terminal 201B of the amplifying circuit 401 of the antenna module 417, and a display 31 connected to the output terminal of the signal processor 14. The switch 423 is connected directly to the output terminal 201B. The DC block capacitor 12 is connected between the switch 423 and the output port 5. The output terminal 201B is coupled to the output port 5 of the amplifier 4 via the switch 423 and the DC block capacitor 12.

The amplifying circuit 401 operates in three different modes C1 to C3 depending on the status of the switches 10 and 423 and the operation of the amplifier 4. In the mode C1, the switch 10 is turned off to be open, the switch 423 is turned on, and the amplifier 4 operates to have power supplied to power supply port 4C from the power supply terminal 55. In the mode C2, the switches 10 and 423 are turned on, and the amplifier 4 operates to have power supplied to power supply port 4C from the power supply terminal 55. In the mode C3, the switch 10 is turned on, the switch 423 is turned off to be open, and the amplifier 4 does not operate, and thus, no power is supplied to power supply port 4C. The operations of the amplifying circuit 401 in the modes C1 to C3 are identical to those of the amplifying circuit 301 shown in FIG. 8 in the modes B1 to B3, providing the same effects.

In the bypass circuit 206 shown in FIG. 9, the switch 10 is directly connected to the port 206A connected to the input terminal 1A. The inductors 8A and the capacitor 9 are connected between the switch 10 and the port 206B connected to the output terminal 201B. Accordingly, when the switch 10 is turned off, the impedance of the bypass circuit 206 as viewed from the input terminal 1A is an impedance of opening. In the mode C1 where the switch 10 is turned off to be open, the signal can not be disturbed by the bypass circuit 206.

When the amplifying circuit 401 according to Embodiment 4 operates in the mode C3, the switch 423 is turned off to be open to disconnect the port 206B of the bypass circuit 206 from the output port 5 of the amplifier 4, hence eliminating an influence of the impedance of the output port 5 of the amplifier 4. This arrangement improves the quality of the signal passing from the antenna 2 across the bypass circuit 206 to the output terminal 201B in the mode C3.

Alternatively, when the operation of the amplifying circuit 401 shifts from the mode C1 or C2 to the mode C3, the switch 423 can be turned off to be open, and then the amplifier 4 stops having power supplied thereto. The amplifier 4 may create a noise upon stopping having power supplied thereto. The switch 23 is turned off to block the noise, hence improving a noise/frequency (N/F) characteristic of the amplifying circuit 401 with a bypassing function.

Exemplary Embodiment 5

Figure 10:
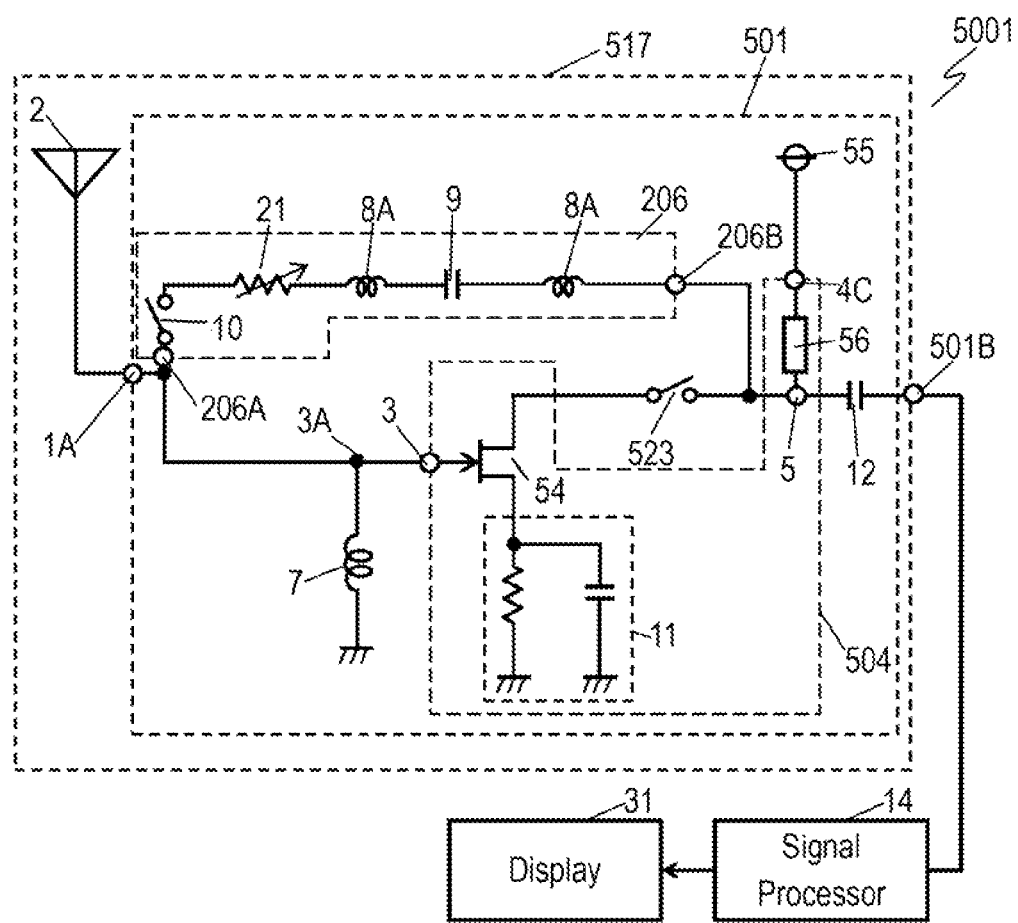
FIG. 10 is a circuit diagram of an amplifying circuit with a bypassing function according to Exemplary Embodiment 5 of the invention.

FIG. 10 is a circuit diagram of an amplifying circuit 501 with a bypassing function according to Exemplary Embodiment 5 of the present invention. In FIG. 10, components identical to those of the amplifying circuit 201 according to Embodiment 2 shown in FIG. 7A are denoted by the same reference numerals, and their description will be omitted. The amplifying circuit 501 includes an amplifier 504 instead of amplifier 4 of the amplifying circuit 201 shown in FIG. 7A. The amplifier 504 further includes a switch 523. An antenna module 517 according to Embodiment 5 includes the amplifying circuit 501 and an antenna 2 connected to an output terminal 1A of the amplifying circuit 501. An electronic apparatus 5001 according to Embodiment 5 includes the antenna module 517, a signal processor 14 connected to the output terminal 501B of the amplifying circuit 501 of the antenna module 517, and a display 31 connected to the output port of the signal processor 14.

The port 206B of the bypass circuit 206 is connected to the output port 5 of the amplifier 504. A direct-current (DC) block capacitor 12 is connected in series between the output port 5 and the output terminal 501B. The switch 523 is connected in series between the output port 5 of the amplifier 504 and the drain 54D of the FET 54 which is an amplifying element, and connects and disconnects between the output port 5 and the FET 54. The switch 523 is connected to the output port 5 and can be closed and opened. The power supply port 4C supply power to the FET 54 for activating the FET 54. The switch 523 is connected in series between the drain 54D of the FET 54 and the output port 5, and is connected in series between the power supply port 4C and the drain 54D of the FET 54. The output terminal 501B is coupled and connected to the output port 5 of the amplifier 504.

The amplifying circuit 501 operates in three modes D1 to D3 depending on the status of the switches 10 and 523. In the mode D1, the switch 10 is turned off to be open while the switch 523 is turned on. In the mode D2, both the switches 10 and 523 are turned on. In the mode D3, the switch 10 is turned on while the switch 523 is turned off to be open.

When the intensity of the signal input to the amplifier 504 is relatively small so as not to distort the signal output from the amplifier 504, the amplifying circuit 501 operates in the mode D1. In the mode D1, the power is supplied via the power supply terminal 55, the load 56, and the power supply port 4C to the FET 54 which is an amplifying element to thus activate the amplifier 504. This mode allows most of the signal received by the antenna 2 to reaches the output port 5 via amplifier 504.

When the intensity of the signal input to by the amplifier 504 is large so as to distort the signal output from the amplifier 504, the amplifying circuit 501 operates in the mode D3. In the mode D3, the FET 54 is supplied no power from the power supply port 55, thus not activating the amplifier 504. This mode allows most of the signal input from the antenna 2 to reach the output port 5 via the bypass circuit 206.

Figure 12:
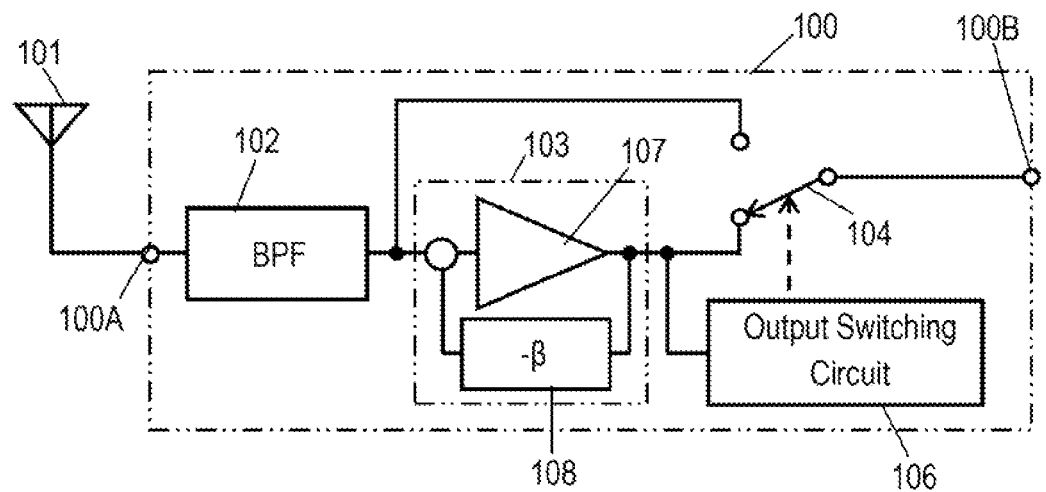
FIG. 12 is a circuit diagram of a conventional amplifying circuit with a bypassing function.

When the intensity of the signal input to the amplifier 504 is intermediate between the intensities in modes D1 and D3, the amplifying circuit 501 operates in the mode D2. In the mode D2, the power is supplied via the power supply terminal 55, the load 56, and the power supply port 4C to the FET 54 which is an amplifying element, to thus activate the amplifier 504. This arrangement activates the amplifier 504 while the bypass circuit 206 is connected. The bypass circuit 206 in the mode D2 functions as a feedback circuit to reduce the gain of the amplifier 504 to an appropriate level. This operation eliminates a feedback circuit 108 of the conventional amplifying circuit 100 with a bypassing function as shown in FIG. 12, hence reducing the size of the amplifying circuit 501. The amplifying circuit 501 operating in the mode D2 has a propagation property of profile 18 between the profiles 15 and 16 shown in FIG. 3, hence preventing the intensity of the signal from decreasing drastically.

More particularly, the amplifying circuit 501 operates in the modes D1 to D3 in response to the intensity of the signal input to the input port 3 of the amplifier 504, as described below. When the intensity of the input signal is smaller than a first predetermined threshold level, the amplifying circuit 501 operates in the mode D3. When the intensity of the input signal is larger than the first threshold level and smaller than a second predetermined level which is larger than the first threshold level, the amplifying circuit 501 operates in the mode D2. When the intensity of the input signal is larger than the second threshold level, the amplifying circuit 501 operates in the mode D1.

Alternatively, the amplifying circuit 501 according to Embodiment 5 may operate only in the modes D1, D3 but not in the mode D2. This operation reduces the time for supplying power to the amplifier 504, accordingly reducing the power consumption of the amplifying circuit 501. More specifically, the amplifying circuit 501 operates in the modes D1 and D3 in response to the intensity of the signal input to the input port 3 of the amplifier 504, as described below. When the intensity of the input signal is smaller than a predetermined threshold level, the amplifying circuit 501 operates in the mode D3. When the intensity of the input signal is larger than the threshold level, the amplifying circuit 501 operates in the mode D1.

In the amplifying circuit 501, the switch 523 is turned on when the amplifier 504 operates. The switch 523 is turned off when the amplifier 504 does not operate. As described above, the status of the switch 523 allows the FET 54, an amplifying element, of the amplifier 504 to be supplied power or no power. The power supply terminal 55 is connected with a regulator which generates the power to activate the amplifier 504. In each of the amplifying circuits 1, 201, 302, and 401 according to Embodiments 1 to 4, the regulator itself is switched for supplying power or no power to the amplifier. In the case that the signal varies in intensity fast, the regulator is switched to supply power or no power to the amplifier accordingly fast. The amplifying circuit 501 according to Embodiment 5 allows the switch 523 to switch the signal path and to switch fast between the supplying of power and the supplying of no power to the FET 54, an amplifying element, while the regulator continues supplying power to the power supply terminal 55. The power consumption of the amplifying circuit 501 in the mode D3 is small, equal to that of the amplifying circuits 1, 201, 301, and 401 in the modes A1 to C1.

The operation of each of the amplifying circuits 1, 201, 301, 401, 501, 1201, and 2201 of the electronic apparatus 1001 to 5001 according to Embodiments 1 to 5 can be switched from one mode to another in response to the intensity of the signal input to the amplifier. Alternatively, the operation of the amplifying circuits 1, 201, 301, 401, 501, 1201, and 2201 can be switched from one mode to another depending on the type of the input signal. More particularly, upon judging that the signal received by the antenna 2 is a predetermined type, the signal processor 14 allows the amplifier 4, 504 to have power supplied thereto. Upon judging that the signal received by the antenna 2 is not the predetermined type, the signal processor 14 stops supplying power to the amplifier 4, 504. This operation reduces power consumption of the amplifying circuits 1, 201, 301, 401, 501, 1201, and 2201.

Figure 11A:
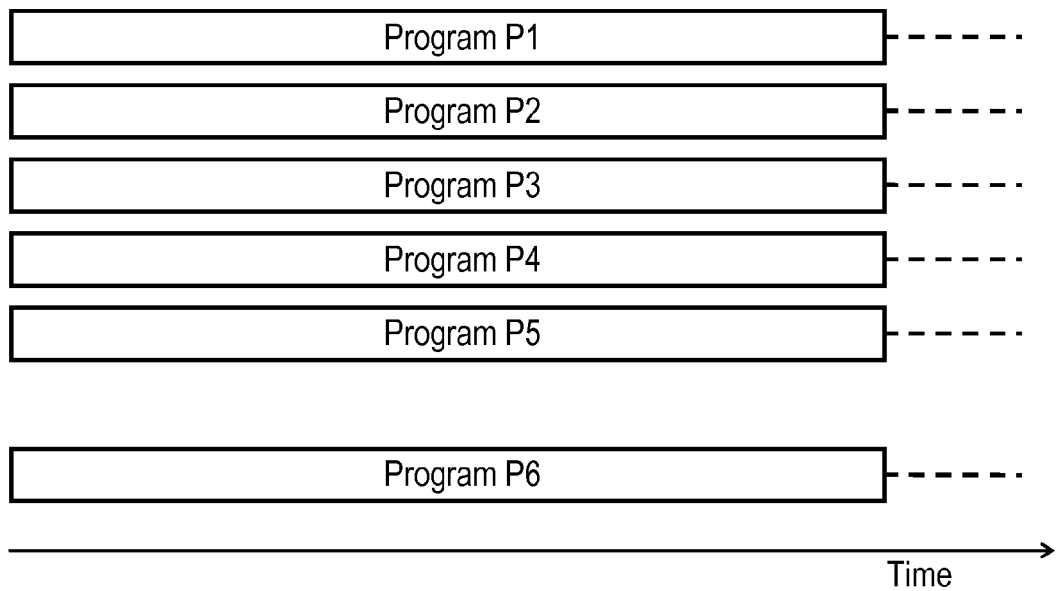
FIG. 11A illustrates programs broadcasted in a DVB-H system.
Figure 11B:
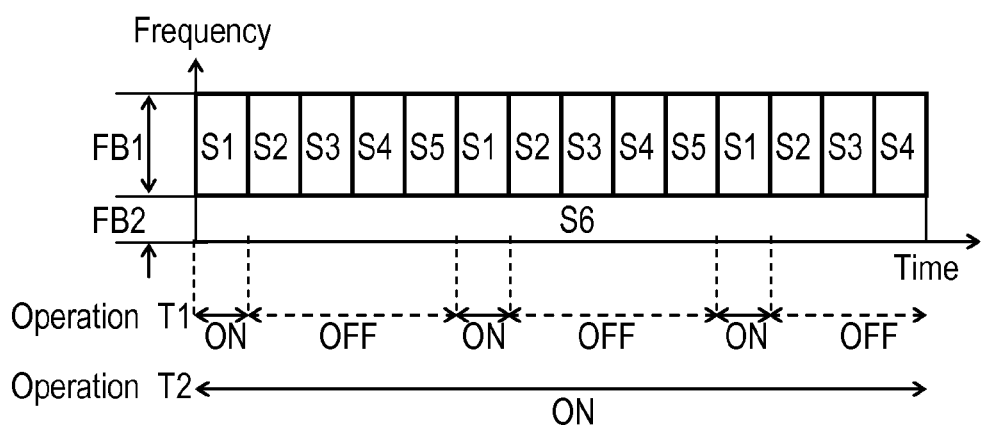
FIG. 11B is a schematic diagram of a DVB-H signal.

An operation of the electronic apparatuses 1001 to 5001 according to Embodiments 1 to 5 will be described. Electronic apparatuses 1001 to 5001 are adapted to receive television programs of digital video broadcasting for handheld (DVB-H) for use with handheld electronic appliances including mobile telephones. FIG. 11A illustrates the television programs P1 to P5 of the DVB-H and a program P6 of a digital video broadcasting for terrestrial (DVB-T) or terrestrial-waves television broadcasting system. As shown in FIG. 11A, the programs P1 to P6 are broadcasted simultaneously, but are packetized to be transmitted. FIG. 11B is a schematic diagram of a time slicing of the DVB-H system where the signals S1 to S6 carrying the programs P1 to P6, respectively, are transmitted as packets. The signal S1 to S5 carrying the programs P1 to P5 of the DVB-H system are transmitted one by one sequentially over one frequency band FB1. This figure shows an operation T1 of electronic apparatuses 1001 to 5001. For example, in the operation T1, the electronic apparatuses 1001 to 5001 receive the program P1. In this case, each of the antenna modules 17, 217, 317, 517 is tuned at the frequency band FB1, and the signal processor 14 processes the signal S1 out of the signals S1 to S5 shown in FIG. 11B which carries the program P1, and allows the display 31 to display an image and output sounds of the program P1 carried by the signal S1. Not needing the other signals S2 to S5 carrying the programs P2 to P5, the signal processor 14 supplies power to the amplifier 4, 504 while receiving the signal S1, and supplies no power to deactivate the amplifier 4, 504 while receiving the signals S2 to S5. This operation reduces power consumption of the amplifying circuits 1, 201, 301, 401, 501, 1201, and 2201 of the electronic apparatuses 1001 to 5001. That is, in the electronic apparatuses 1001 to 5001, the signal processor 14 supplies power to the amplifier 4, 504 to operate when receiving a target signal out of the signals received by the antenna 2. The signal processor 14 supplies no power to deactivate the amplifier 4, 504 when not receiving the target signal, i.e., when receiving a signal out of the received signal other than the target signal. In this case, when the target signal is not received, the amplifying circuit 1, 201, 301, 401, or 501 may operates in the modes A3 to D3 with the amplifier 4, 504 deactivated and the switch 10 turned on. This operation allows the signal processor 14 to monitor the intensity of the received signals via the bypass circuit 6 while receiving the signal other than the target signal. Even when the target signal is not received, the signal processor 14 can select an optimum mode out of modes A1 to A3, B1 to B3, C1 to C3, or D1 to D3 to activate amplifying circuit 1, 201, 301, 401, 501, 1201, or 2201 to receive the target signal in the optimum mode. Thus, the electronic apparatuses 1001 to 5001 can receive the target signal S1 with small power consumption with the amplifier 4, 504 producing no signal distortion, and allows the display to display the image and output sounds of the program P1 at high quality.

Then, an operation of the electronic apparatuses 1001 to 5001 according to Embodiments 1 to 5 will be described. The electronic apparatuses 1001 to 5001 are adapted to receive television signals of the DVB-T system. As shown in FIG. 11B, a signal S6 carrying a program P6 of the DVB-H system is transmitted continuously over a frequency band FB2 which is different from the frequency band FB1 over which the signal S1 to S5 carrying programs P1 to P5 of the DVB-H system are transmitted. The electronic apparatuses 1001 to 5001 execute an operation T2. This figure shows the operation T2 of electronic apparatuses 1001 to 5001. In the operation T2, the program P6 is received by the electronic apparatuses 1001 to 5001. More particularly, each of the antenna modules 17, 217, 317, and 517 is tuned at the frequency band FB2. The signal processor 14 supplies power to the amplifier 4, 504 to operate and continuously processes the signal S6 shown in FIG. 11B, and allows the display 31 to display an image and output sounds of the program P6 carried by the signal S6. While receiving the signal S6, the signal processor 14 selects an optimum mode out of modes A1 to A3, B1 to B3, C1 to C3, or D1 to D3 in accordance with the intensity of the signal S6, and allows amplifying circuit 1, 201, 301, 401, 501, 1201, or 2201 to receive the signal S6 in the selected mode. Thus, the electronic apparatuses 1001 to 5001 can receive the signal S6 with small power consumption with the amplifier 4, 504 producing no signal distortion, hence allowing display 31 to display the image and output sounds of the program P6 at high quality.

Each of the bypass equipped amplifying circuits 1, 201, 301, 401, 501, 1201, 2201 can be assembled together with the signal processor 14 on a single semiconductor chip, reducing the size and power consumption of the electronic apparatuses 1001 to 5001.

An amplifying circuit with a bypassing function according to the present invention does not reduce power of a signal drastically even when the signal passes through a bypass circuit, as compared to passing through an amplifier, thus maintaining a profile of a propagation property unchanged and providing a preferable transmission quality. The amplifying circuit is useful for an electronic apparatus having excellent receiving quality.

The invention claimed is:
1. An amplifying circuit with a bypassing function, comprising:
an input terminal to which a signal is input from an antenna;
an amplifier including
an input port connected to the input terminal, and
an output port;

a first inductor connected between the input port and a ground;
a bypass circuit including
a first port connected to the input terminal,
a second port connected to the output port of the amplifier,
a first switch connected in series between the first port and the second port, the first switch being configured to be closed and opened,
a capacitor connected in series to the first switch between the first port and the second port, and
a second inductor connected in series to the first switch and the capacitor between the first port and the second port; and
an output terminal connected to the output port of the amplifier;
wherein the bypass circuit further includes a variable resistor connected in series to the first switch, the capacitor, and the second inductor between the first port and the second port.

2. An amplifying circuit with a bypassing function, comprising:
an input terminal to which a signal is input from an antenna;
an amplifier including
an input port connected to the input terminal, and
an output port;
a first inductor connected between the input port and a ground;
a bypass circuit including
a first port connected to the input terminal,
a second port connected to the output port of the amplifier,
a first switch connected in series between the first port and the second port, the first switch being configured to be closed and opened,
a capacitor connected in series to the first switch between the first port and the second port, and
a second inductor connected in series to the first switch and the capacitor between the first port and the second port; and
an output terminal connected to the output port of the amplifier;
wherein the capacitor is a variable capacitance element.

3. The amplifying circuit according to claim 2, wherein the bypass circuit further includes a variable resistor connected in series to the first switch, the capacitor, and the second inductor between the first port and the second port.

4. An amplifying circuit with a bypassing function, comprising:
an input terminal to which a signal is input from an antenna;
an amplifier including
an input port connected to the input terminal, and
an output port;
a first inductor connected between the input port and a ground;
a bypass circuit including
a first port connected to the input terminal,
a second port connected to the output port of the amplifier,
a first switch connected in series between the first port and the second port, the first switch being configured to be closed and opened,
a capacitor connected in series to the first switch between the first port and the second port, and
a second inductor connected in series to the first switch and the capacitor between the first port and the second port; and
an output terminal connected to the output port of the amplifier;
wherein the amplifier further includes a power supply port for supplying power to the amplifier to activate the amplifier,
in a case that an intensity of a signal input to the input port of the amplifier is smaller than a first predetermined threshold level, power is supplied to the power supply port, and the first switch is opened,
in a case that the intensity of the signal input to the input port is larger than the first predetermined threshold level and smaller than a second predetermined threshold level which is greater than the first predetermined threshold level, power is supplied to the power supply port, and the first switch is closed, and
in a case that the intensity of the signal input to the input port is larger than the second predetermined threshold level, no power is supplied to the power supply port, and the first switch is closed.

5. An amplifying circuit with a bypassing function, comprising:
an input terminal to which a signal is input from an antenna;
an amplifier including
an input port connected to the input terminal, and
an output port;
a first inductor connected between the input port and a ground;
a bypass circuit including
a first port connected to the input terminal,
a second port connected to the output port of the amplifier,
a first switch connected in series between the first port and the second port, the first switch being configured to be closed and opened,
a capacitor connected in series to the first switch between the first port and the second port, and
a second inductor connected in series to the first switch and the capacitor between the first port and the second port; and
an output terminal connected to the output port of the amplifier;
wherein the amplifier further includes a power supply port for supplying power to the amplifier to activate the amplifier,
in a case that an intensity of a signal input to the input port of the amplifier is smaller than a predetermined threshold level, power is supplied to the power supply port, and the first switch is opened, and
in a case that the intensity of the signal input to the input port is larger than the predetermined threshold level, no power is supplied to the power supply port, and the first switch is closed.

6. An amplifying circuit with a bypassing function, comprising:
an input terminal to which a signal is input from an antenna;
an amplifier including
an input port connected to the input terminal, and
an output port;
a first inductor connected between the input port and a ground;
a bypass circuit including
a first port connected to the input terminal, a second port connected to the output port of the amplifier, a first switch connected in series between the first port and the second port, the first switch being configured to be closed and opened, a capacitor connected in series to the first switch between the first port and the second port, and a second inductor connected in series to the first switch and the capacitor between the first port and the second port; and an output terminal connected to the output port of the amplifier;

wherein a second switch is connected in series between the output port of the amplifier and the second port of the bypass circuit, the second switch being configured to be closed and opened; and wherein the amplifier further includes a power supply port for supplying power to the amplifier to activate the amplifier, in a case that an intensity of a signal input to the input port of the amplifier is smaller than a first predetermined threshold level, power is supplied to the power supply port, the first switch is opened, and the second switch is closed, in a case that the intensity of the signal input to the input port is larger than the first predetermined threshold level and smaller than a second predetermined threshold level which is larger than the first predetermined threshold level, power is supplied to the power supply port, the first switch is closed, and the second switch is closed, and in a case that the intensity of the signal input to the input port is larger than the second predetermined threshold level, no power is supplied to the power supply port, the first switch is closed, and the second switch is opened.

7. The amplifying circuit according to claim 6, wherein the supplying of the power to the amplifier is stopped after the second switch is opened.

8. An amplifying circuit with a bypassing function, comprising:

an input terminal to which a signal is input from an antenna;

an amplifier including
an input port connected to the input terminal, and
an output port;

a first inductor connected between the input port and a ground;

a bypass circuit including
a first port connected to the input terminal,
a second port connected to the output port of the amplifier,
a first switch connected in series between the first port and the second port, the first switch being configured to be closed and opened,
a capacitor connected in series to the first switch between the first port and the second port, and
a second inductor connected in series to the first switch and the capacitor between the first port and the second port; and an output terminal connected to the output port of the amplifier;

wherein a second switch is connected in series between the output port of the amplifier and the second port of the bypass circuit, the second switch being configured to be closed and opened; and wherein the amplifier further includes a power supply port for supplying power to the amplifier to activate the amplifier, in a case that an intensity of a signal input to the input port of the amplifier is smaller than a predetermined threshold level, the power is supplied to power supply port, the first switch is opened, and the second switch is closed, and in a case that the intensity of the signal input to the input port is larger than the predetermined threshold level, no power is supplied to the power supply port, the first switch is closed, and the second switch is opened.

9. The amplifying circuit according to claim 8, wherein the supplying of the power to the amplifier is stopped after the second switch is opened.

10. An amplifying circuit with a bypassing function, comprising:

an input terminal to which a signal is input from an antenna;

an amplifier including
an input port connected to the input terminal, and
an output port;

a first inductor connected between the input port and a ground;

a bypass circuit including
a first port connected to the input terminal,
a second port connected to the output port of the amplifier,
a first switch connected in series between the first port and the second port, the first switch being configured to be closed and opened,
a capacitor connected in series to the first switch between the first port and the second port, and
a second inductor connected in series to the first switch and the capacitor between the first port and the second port; and an output terminal connected to the output port of the amplifier;

wherein a second switch is connected to the output port of the amplifier, the second switch being configured to be closed and opened;

wherein the amplifier further includes
an amplifying element for amplifying the signal input to the input port and output the amplified signal to the output port, and
a power supply port for supplying power to the amplifying element to activate the amplifying element; and wherein the second switch is connected in series between the amplifying element and the output port and in series between the amplifying element and the power supply port.

11. The amplifying circuit according to claim 1, wherein the first switch is connected directly to the first port of the bypass circuit, and
the second inductor and the capacitor are connected between the first switch and the second port of the bypass circuit.

12. An electronic apparatus comprising:
an antenna;
an amplifier including
an input port connected to the antenna, and
an output port;
a first inductor connected between the input port and a ground;
a bypass circuit including
a first port connected to the antenna,
a second port connected to the output port of the amplifier, a first switch connected in series between the first port and the second port, the first switch being configured to be closed and opened, a capacitor connected in series with the first switch between the first port and the second port, and a second inductor connected in series with the first switch and the capacitor between the first port and the second port;

an output terminal connected to the output port of the amplifier; and a signal processor connected to the output terminal;

wherein the amplifier further includes a power supply port for supplying power to the amplifier to activate the amplifier, and upon judging that the antenna does not receive a predetermined signal, the signal processor stops supplying the power to the amplifier.

13. The electronic apparatus according to claim 12, wherein the antenna includes an open end.

14. The electronic apparatus according to claim 12, wherein, while stopping supplying the power to the amplifier, the signal processor closes the first switch and detects an intensity of a signal passing through the bypass circuit from the antenna.

15. The electronic apparatus according to claim 12, further comprising a display connected to the signal processor.

16. The amplifying circuit according to claim 2, wherein
the first switch is connected directly to the first port of the bypass circuit, and
the second inductor and the capacitor are connected between the first switch and the second port of the bypass circuit.

* * * * *